US008618218B2

(12) United States Patent
Ramalingam et al.

(10) Patent No.: US 8,618,218 B2
(45) Date of Patent: Dec. 31, 2013

(54) BLENDS OF POLYSILOXANE/POLYIMIDE BLOCK COPOLYMER AND POLY(ARYLENE SULFIDE)

(75) Inventors: Hariharan Ramalingam, Bangalore (IN); Yashpal Bhandari, Evansville, IN (US); Gautam Chatterjee, Bangalore (IN); Siva Kumar Sreeramagiri, Bangalore (IN); Sanjay Braj Mishra, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 273 days.

(21) Appl. No.: 13/246,570

(22) Filed: Sep. 27, 2011

(65) Prior Publication Data
US 2013/0079474 A1 Mar. 28, 2013

(51) Int. Cl.
C08L 79/08 (2006.01)
C08L 81/04 (2006.01)
C08L 83/10 (2006.01)

(52) U.S. Cl.
USPC ............................. 525/179; 525/180; 525/182

(58) Field of Classification Search
None
See application file for complete search history.

(56) References Cited

U.S. PATENT DOCUMENTS

| | | | |
|---|---|---|---|
| 3,185,719 A | 5/1965 | Prober | |
| 3,354,129 A | 11/1967 | Edmonds, Jr. et al. | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,919,177 A | 11/1975 | Campbell | |
| 3,972,902 A | 8/1976 | Heath et al. | |
| 3,983,093 A | 9/1976 | Williams, III et al. | |
| 4,017,555 A | 4/1977 | Alvarez | |
| 4,396,658 A | 8/1983 | Mettes et al. | |
| 4,443,591 A | 4/1984 | Schmidt et al. | |
| 4,455,410 A | 6/1984 | Giles, Jr. | |
| 4,769,424 A | 9/1988 | Takekoshi et al. | |
| 4,808,686 A | 2/1989 | Cella et al. | |
| 5,056,125 A | 10/1991 | Beland | |
| 5,157,085 A | 10/1992 | Ohta et al. | |
| 5,430,102 A | 7/1995 | Glaser et al. | |
| 5,437,930 A | 8/1995 | Redondo et al. | |
| 5,437,970 A | 8/1995 | Shono | |
| 5,502,102 A | 3/1996 | Nazareth | |
| 5,612,401 A | 3/1997 | Brown et al. | |
| 6,080,822 A | 6/2000 | Haubs et al. | |
| 8,013,076 B2 * | 9/2011 | Haralur et al. | 525/422 |
| 8,013,251 B2 * | 9/2011 | Bhandari et al. | 174/110 SR |
| 2010/0147548 A1 | 6/2010 | Bhandari et al. | |
| 2010/0248106 A1 * | 9/2010 | Wu | 430/104 |
| 2013/0062045 A1 * | 3/2013 | Chu et al. | 165/185 |

FOREIGN PATENT DOCUMENTS

| | | |
|---|---|---|
| JP | 61247435 A | 11/1986 |
| JP | 1299872 A | 12/1989 |
| JP | 3236930 A | 10/1991 |
| JP | 3236931 A | 10/1991 |
| WO | 2007149639 A1 | 12/2007 |

OTHER PUBLICATIONS

International Search Report for International Application No. PCT/US2012/057183, International Application Filing Date: Sep. 25, 2012, Date of Mailing Mar. 20, 2013, 4 pages.
Written Opinion for International Application No. PCT/US2012/057183, International Application Filing Date: Sep. 25, 2012, Date of Mailing Mar. 20, 2013, 5 pages.
Japanese Patent No. 1299872 (A); Publication Date: Dec. 4, 1989; Abstract Only; 1 Page.
Japanese Patent No. 3236930 (A); Publication Date: Oct. 22, 1991; Abstract Only; 1 Page.
Japanese Patent No. 3236931 (A); Publication Date: Oct. 22, 1991; Abstract Only; 1 Page.
Japanese Patent No. 4065689 (B); Publication Date: Oct. 20, 1991; Equivalent to Japanese Patent No. 61247435 and Japanese Patent No. 1774562; Abstract Only; 1 Page.

* cited by examiner

*Primary Examiner* — Robert Sellers
(74) *Attorney, Agent, or Firm* — Cantor Colburn LLP; Diderico van Eyl

(57) ABSTRACT

Disclosed herein is a composition comprising a compatible blend of i) 24 to less than 84.5 weight percent of a linear poly(arylene sulfide), ii) 14 to 75 weight percent of a polysiloxane/polyimide block copolymer; and iii) 0.1 to less than 2.5 weight percent of a polymeric compatibilizer having 2 or more epoxy groups per molecule. Weight percent is based on the total weight of the composition. An article made from the composition has tensile elongation greater than or equal to 60% as determined by ASTM D638 and a Notched Izod impact strength greater than 50 joules per meter as determined by ASTM D256 at room temperature.

25 Claims, No Drawings

BLENDS OF POLYSILOXANE/POLYIMIDE BLOCK COPOLYMER AND POLY(ARYLENE SULFIDE)

BACKGROUND

Poly(arylene sulfide)s are crystalline engineering thermoplastics with high melting temperatures, typically on the order of 285° C., and are characterized by low flammability, high modulus, and excellent chemical resistance to aggressive chemicals and solvents. However, their glass transition temperatures are very low, typically as low as 85° C.; as a consequence, heat distortion temperatures are low in the in the absence of reinforcement with fillers such as glass fiber. In addition, poly(arylene sulfide)s are very brittle, as evidenced by a tensile elongation for polyphenylene sulfide usually no greater than about 2.5% and frequently below 1%.

Siloxane polyetherimides are a widely used class of thermoplastic engineering resins characterized by excellent hydrolytic stability, dimensional stability, toughness, heat resistance, and dielectric properties. However, they are deficient in certain other properties such as solvent resistance and flow in comparison with crystalline materials.

It might be expected that blends of poly(arylene sulfide)s and polysiloxane polyetherimide copolymers could be prepared which would have such properties as high solvent resistance, high heat distortion temperature, good ductility, and resistance to flammability. However, blends of this type are incompatible and undergo phase separation and delamination, as a result of little or no phase interaction between the two phases. Molded parts made from such blends are typically characterized by low tensile elongation and insufficient impact strength.

A need exists for blends of poly(arylene sulfide)s and polysiloxane polyetherimide copolymers having a combination of high tensile elongation and high Notched Izod impact properties.

BRIEF DESCRIPTION

The foregoing need is addressed, at least in part, by a composition comprising a compatible blend of i) 24 to less than 84.5 weight percent of a linear poly(arylene sulfide), ii) 14 to 75 weight percent of a polysiloxane/polyimide block copolymer; and iii) 0.1 to less than 2.5 weight percent of a polymeric compatibilizer having an average of 2 or more pendant epoxy groups per molecule. Weight percent is based on the total weight of the composition. An article made from the composition (i) a has tensile elongation greater than or equal to 60% as determined by ASTM D638 and (ii) a Notched Izod impact of greater than 50 joules per meter as determined by ASTM D256 at room temperature.

DETAILED DESCRIPTION

Our invention is based on the discovery that by the use of a specific combination of a linear poly(arylene sulfide), polysiloxane/polyimide block copolymer, and polymeric compatibilizer having an average of 2 or more pendant epoxy groups per molecule, it is now possible make a composition exhibiting a combination of useful properties: (i) a tensile elongation greater than or equal to 60% as determined by ASTM D638, and (ii) a Notched Izod impact of greater than 50 joules per meter as determined by ASTM D256 at room temperature. When amounts of the linear poly(arylene sulfide) and polysiloxane/polyimide block copolymer outside of the specified amounts are used the tensile elongation is significantly lower or both of these properties are not achieved. Similarly, when the linear poly(arylene sulfide) and polysiloxane/polyimide block copolymer are combined in the absence of the polymeric compatibilizer the tensile elongation is significantly lower than when the polymeric compatibilizer is used or both of these properties are not achieved.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

An article made from the composition has a tensile elongation at break greater than or equal to 60%. The article can have a tensile elongation at break greater than or equal to 80%. The tensile elongation can be less than or equal to 200% as determined by ASTM D638.

An article made from the composition can have a heat deflection temperature of greater than or equal to 90 degrees C., more specifically greater than or equal to 100 degrees C. at 1.82 megapascals as determined by ASTM D648.

An article made from the composition has a Notched Izod impact strength of greater than or equal to 50 Joules per meter. The article can have a Notched Izod impact strength greater than or equal to 60 Joules per meter as determined by ASTM D256 at room temperature.

Poly(arylene sulfide)s are known polymers containing arylene groups separated by sulfur atoms. They include poly(phenylene sulfide)s, for example poly(phenylene sulfide) and substituted poly(phenylene sulfide)s. Typical poly(arylene sulfide) polymers comprise at least 70 molar %, preferably at least 90 molar %, of recurring units of the following structural formula:

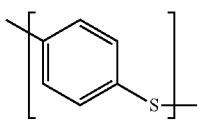

The poly(arylene sulfide) is a linear polymer. Linear poly(arylene sulfide) may be prepared by, for example, a process disclosed in U.S. Pat. No. 3,354,129 or 3,919,177 both of which are incorporated herein by reference. Linear poly(arylene sulfide) is commercially available from Ticona as Fortron® PPS and from Chevron Phillips as Ryton® PPS.

The poly(arylene sulfide) may be functionalized or unfunctionalized. If the poly(arylene sulfide) is functionalized, the functional groups may include, but are not limited to, amino, carboxylic acid, metal carboxylate, disulfide, thio, and metal thiolate groups. One method for incorporation of functional groups into poly(arylene sulfide) can be found in U.S. Pat. No. 4,769,424, incorporated herein by reference, which discloses incorporation of substituted thiophenols into halogen substituted poly(arylene sulfide). Another method involves incorporation of chlorosubstituted aromatic compounds containing the desired functionality reacted with an alkali metal sulfide and chloroaromatic compounds. A third method involves reaction of poly(arylene sulfide) with a disulfide containing the desired functional groups, typically in the melt or in a suitable high boiling solvent such as chloronaphthalene.

Though the melt viscosity of poly(arylene sulfide) is not particularly limited so far as the moldings which can be obtained, the melt viscosity can be greater than or equal to 100 Poise and less than of equal to 10,000 Poise at the melt processing temperature.

The poly(arylene sulfide) may also be treated to remove contaminating ions by immersing the resin in deionized water or by treatment with an acid, typically hydrochloric acid, sulfuric acid, phosphoric acid or acetic acid as found in 10 Japanese Kokai Nos. 3236930-A, 1774562-A, 12299872-A and 3236931-A. For some product applications, it is preferred to have a very low impurity level in the poly(arylene sulfide), represented as the percent by weight ash remaining after burning a sample of the poly(arylene sulfide). The ash content of the poly(arylene sulfide) can be less than about 1% by weight, more specifically less than about 0.5% by weight, or even more specifically less than about 0.1% by weight.

The poly(arylene sulfide) is present in an amount of 24 to less than 84.5 weight percent, based on the total weight of the composition. Within this range the amount of poly(arylene sulfide) can be greater than or equal to 30 weight percent, or more specifically, greater than or equal to 40 weight percent. Also within this range the amount of poly(arylene ether) can be less than or equal to 80, or, more specifically, less than or equal to 75 weight percent.

The polysiloxane/polyimide block copolymer has a siloxane content greater than or equal to 20 weight percent (wt %), based on the total weight of the block copolymer, and comprises repeating units (d) of Formula (I)

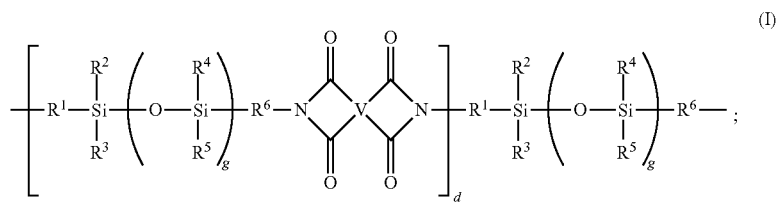

wherein $R^{1-6}$ are independently at each occurrence selected from the group consisting of substituted or unsubstituted, saturated, unsaturated or aromatic monocyclic groups having 5 to 30 carbon atoms, substituted or unsubstituted, saturated, unsaturated or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms, and combinations comprising at least one of the foregoing linkers, g equals 1 to 30, and d is 2 to 20.

Polysiloxane/polyimide block copolymers comprise polysiloxane blocks and polyimide blocks. In random polysiloxane/polyimide block copolymers the size of the siloxane block is determined by the number of siloxane units (analogous to g in Formula (I)) in the monomer used to form the block copolymer. In some non-random polysiloxane/polyimide block copolymers the order of the polyimide blocks and polysiloxane blocks is determined but the size of the siloxane block is still determined by the number of siloxane units in the monomer. In contrast, the polysiloxane/polyimide block copolymers described herein have extended siloxane blocks. Two or more siloxane monomers are linked together to form an extended siloxane oligomer which is then used to form the block copolymer.

Polysiloxane/polyimide block copolymers having extended siloxane blocks are made by forming an extended siloxane oligomer and then using the extended siloxane oligomer to make the block copolymer. The extended siloxane oligomer is made by reacting a diamino siloxane and a dianhydride wherein either the diamino siloxane or the dianhydride is present in 10 to 50% molar excess, or, more specifically, 10 to 25% molar excess. "Molar excess" as used in this context is defined as being in excess of the other reactant. For example, if the diamino siloxane is present in 10% molar excess then for 100 moles of dianhydride are present there are 110 moles of diamino siloxane.

Diamino siloxanes have Formula (VI)

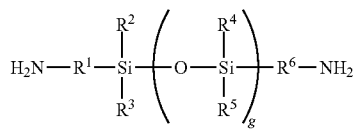

wherein $R^{1-6}$ and g are defined as above. In one embodiment $R^{2-5}$ are methyl groups and $R^1$ and $R^6$ are alkylene groups. The synthesis of diamino siloxanes is known in the art and is taught, for example, in U.S. Pat. Nos. 3,185,719 and 4,808,686. In one embodiment $R^1$ and $R^6$ are alkylene groups having 3 to 10 carbons. In some embodiments $R^1$ and $R^6$ are the same and in some embodiments $R^1$ and $R^6$ are different.

Dianhydrides useful for forming the extended siloxane oligomer have the Formula (VII)

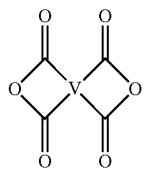

wherein V is a tetravalent linker as described above. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of Formula (VIII), such as:

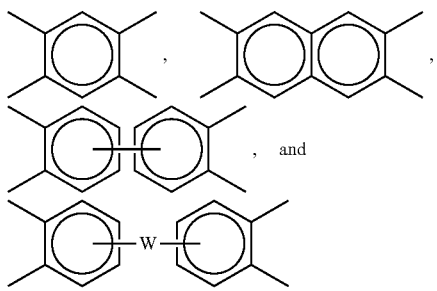

wherein W is a divalent moiety such as —O—, —S—, —C(O)—, —SO$_2$—, —SO—, —C$_y$H$_{2y}$— (y being an integer of 1 to 20), and halogenated derivatives thereof, including perfluoroalkylene groups, or a group of the Formula —O—Z—O— wherein the divalent bonds of the —O— or the —O—Z—O— group are in the 3,3', 3,4', 4,3', or the 4,4' positions, and wherein Z includes, but is not limited to, divalent moieties of Formula (IX)

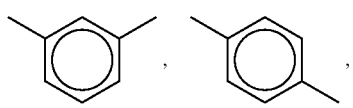

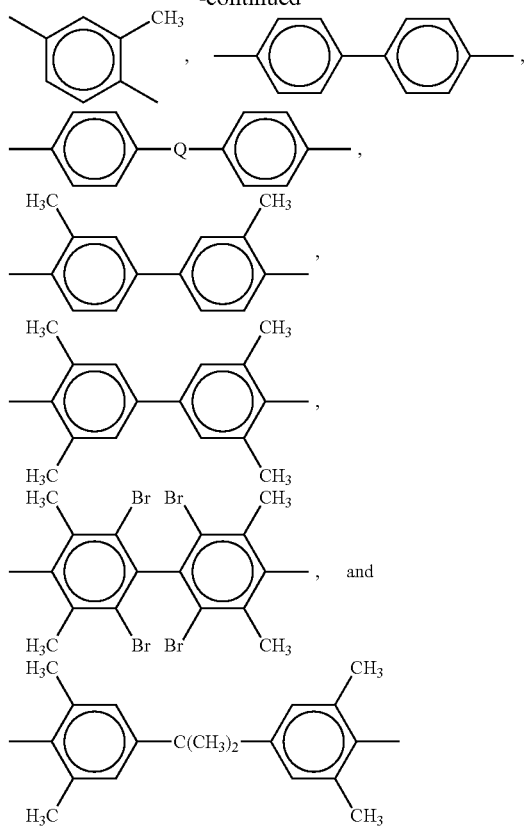

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker V is free of halogens.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

The bis(ether anhydride)s can be prepared by hydrolysis, followed by dehydration, of the reaction product of a nitro substituted phenyl dinitrile with a metal salt of dihydric phenol compound in the presence of a dipolar, aprotic solvent.

A chemical equivalent to a dianhydride may also be used. Examples of dianhydride chemical equivalents include tetrafunctional carboxylic acids capable of forming a dianhydride, and ester or partial ester derivatives of the tetra functional carboxylic acids. Mixed anhydride acids or anhydride esters may also be used as an equivalent to the dianhydride. As used throughout the specification and claims "dianhydride" will refer to dianhydrides and their chemical equivalents.

The diamino siloxane and dianhydride can be reacted in a suitable solvent, such as a halogenated aromatic solvent, for example orthodichlorobenzene, optionally in the presence of a polymerization catalyst such as an alkali metal aryl phosphinate or alkali metal aryl phosphonate, for example, sodium phenylphosphonate. In some instances the solvent will be an aprotic polar solvent with a molecular weight less than or equal to 500 to facilitate removal of the solvent from the polymer. The temperature of the reaction can be greater than or equal to 100° C. and the reaction may run under azeotropic conditions to remove the water formed by the reaction. In some embodiments the polysiloxane/polyimide block copolymer has a residual solvent content less than or equal to 500 parts by weight of solvent per million parts by weight of polymer (ppm), or, more specifically, less than or equal to 250 ppm, or, even more specifically, less than or equal to 100 ppm. Residual solvent content may be determined by a number of methods including, for example, gas chromatography.

The stoichiometric ratio of the diamino siloxane and dianhydride in the reaction to form the siloxane oligomer determines the degree of chain extension, (d in Formula (I)+1) in the extended siloxane oligomer. For example, a stoichiometric ratio of 4 diamino siloxane to 6 dianhydride will yield a siloxane oligomer with a value for d+1 of 4. As understood by one of ordinary skill in the art, d+1 is an average value for the siloxane containing portion of the block copolymer and the value for d+1 is generally rounded to the nearest whole number. For example, a value for d+1 of 4 includes values of 3.5 to 4.5.

In some embodiments d is less than or equal to 50, or, more specifically, less than or equal to 25, or, even more specifically, less than or equal to 10.

The extended siloxane oligomers described above are further reacted with non-siloxane diamines and additional dianhydrides to make the polysiloxane/polyimide block copolymer. The overall molar ratio of the total amount of dianhydride and diamine (the total of both the siloxane and non-siloxane containing diamines) used to make the polysiloxane/polyimide block copolymer should be about equal so that the copolymer can polymerize to a high molecule weight. In some embodiments the ratio of total diamine to total dianhydride is 0.9 to 1.1, or, more specifically 0.95 to 1.05. In some embodiments the polysiloxane/polyimide block copolymer will have a number average molecular weight (Mn) of 5,000 to 50,000 Daltons, or, more specifically, 10,000 to 30,000 Daltons. The additional dianhydride may be the same or different from the dianhydride used to form the extended siloxane oligomer.

The non-siloxane polyimide block comprises repeating units having the general Formula (X):

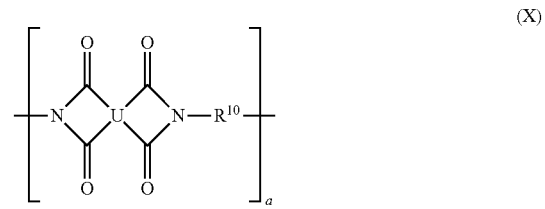

wherein a is more than 1, typically 10 to 1,000 or more, and can specifically be 10 to 500; and wherein U is a tetravalent linker without limitation, as long as the linker does not impede synthesis of the polyimide oligomer. Suitable linkers include, but are not limited to: (a) substituted or unsubstituted, saturated, unsaturated or aromatic monocyclic and polycyclic groups having 5 to 50 carbon atoms, (b) substituted or unsubstituted, linear or branched, saturated or unsaturated alkyl groups having 1 to 30 carbon atoms, and combinations comprising at least one of the foregoing linkers. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of Formula (VIII), such as:

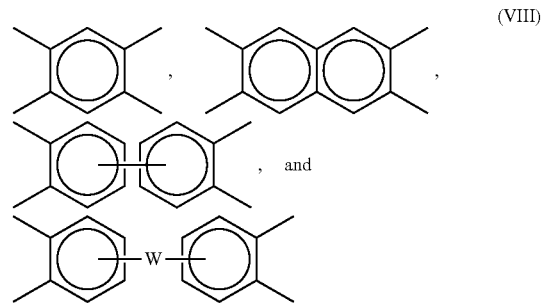

wherein W is a divalent moiety such as —O—, —S—, —C(O)—, —SO$_2$—, —SO—, —C$_y$H$_{2y}$— (y being an integer of 1 to 20), and halogenated derivatives thereof, including perfluoroalkylene groups, or a group of the Formula —O—Z—O— wherein the divalent bonds of the —O— or the —O—Z—O— group are in the 3,3', 3,4', 4,3', or the 4,4' positions, and wherein Z includes, but is not limited to, divalent moieties of Formula (IX),

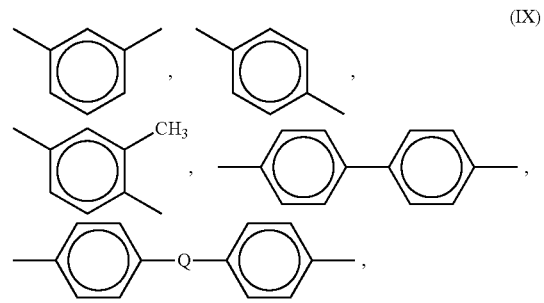

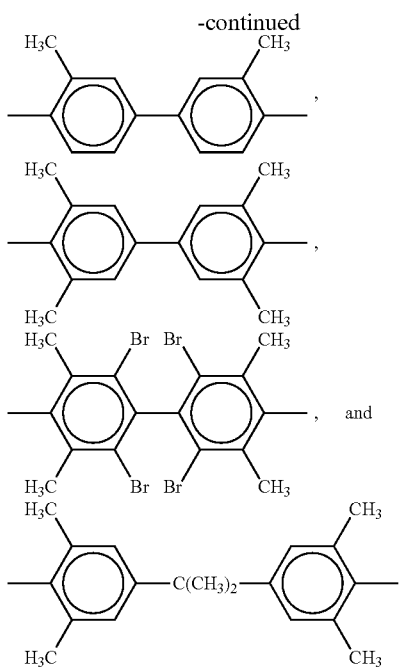

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker U is free of halogens.

In some embodiments V in the polysiloxane block and U in the polyimide block are the same. In some embodiments V and U are different.

R$^{10}$ in Formula (X) includes, but is not limited to, substituted or unsubstituted divalent organic moieties such as: aromatic hydrocarbon moieties having 6 to 20 carbons and halogenated derivatives thereof; straight or branched chain alkylene moieties having 2 to 20 carbons; cycloalkylene moieties having 3 to 20 carbon atom; or divalent moieties of the general Formula (XI)

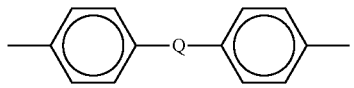

(XI)

wherein Q is defined as above. In some embodiments R$^9$ and R$^{10}$ are the same and in some embodiments R$^9$ and R$^{10}$ are different.

In some embodiments the polysiloxane/polyimide block copolymer is halogen free. Halogen free is defined as having a halogen content less than or equal to 1000 parts by weight of halogen per million parts by weight of block copolymer (ppm). The amount of halogen can be determined by ordinary chemical analysis such as atomic absorption. Halogen free polymers will further have combustion products with low smoke corrosivity, for example as determined by DIN 57472 part 813. In some embodiments smoke conductivity, as judged by the change in water conductivity can be less than or equal to 1000 micro Siemens. In some embodiments the smoke has an acidity, as determined by pH, greater than or equal to 5.

In one embodiment the non-siloxane polyimide blocks comprise a polyetherimide block. Polyetherimide blocks comprise repeating units of Formula (XII):

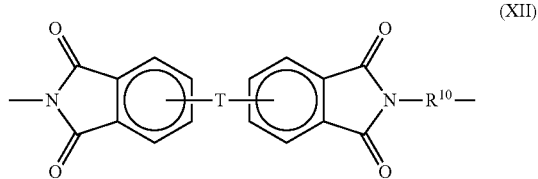

(XII)

wherein T is —O— or a group of the Formula —O—Z—O— wherein the divalent bonds of the —O— or the —O—Z—O— group are in the 3,3', 3,4', 4,3', or the 4,4' positions, and wherein Z and R$^{10}$ are defined as described above.

The polyetherimide block can comprise structural units according to Formula (XII) wherein each R$^{10}$ is independently derived from p-phenylene, m-phenylene, diamino aryl sulfone or a mixture thereof, and T is a divalent moiety of the Formula (XIII):

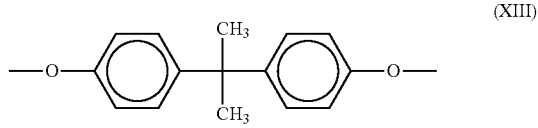

(XIII)

Included among the many methods of making the polyimide oligomer, particularly polyetherimide oligomers, are those disclosed in U.S. Pat. Nos. 3,847,867; 3,850,885; 3,852,242; 3,855,178; 3,983,093; and 4,443,591.

The repeating units of Formula (X) and Formula (XII) are formed by the reaction of a dianhydride and a diamine. Dianhydrides useful for forming the repeating units have the Formula (XIV)

(XIV)

wherein U is as defined above. As mentioned above the term dianhydrides includes chemical equivalents of dianhydrides.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

Diamines useful for forming the repeating units of Formula (X) and (XII) have the Formula (XV)

$$H_2N-R^{10}-NH_2 \qquad (XV)$$

wherein $R^{10}$ is as defined above. Examples of specific organic diamines are disclosed, for example, in U.S. Pat. Nos. 3,972,902 and 4,455,410. Exemplary diamines include ethylenediamine, propylenediamine, trimethylenediamine, diethylentriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis(3-aminopropyl) tetramethyldisiloxane. Mixtures of these compounds may also be used. In one embodiment the diamine is an aromatic diamine, or, more specifically, m-phenylenediamine, p-phenylenediamine, sulfonyl dianiline, and mixtures thereof.

In general, the reactions can be carried out employing various solvents, e.g., o-dichlorobenzene, m-cresol/toluene, and the like, to effect a reaction between the dianhydride of Formula (XIV) and the diamine of Formula (XV), at temperatures of 100° C. to 250° C. Alternatively, the polyimide block or polyetherimide block can be prepared by melt polymerization or interfacial polymerization, e.g., melt polymerization of an aromatic bis(ether anhydride) and a diamine by heating a mixture of the starting materials to elevated temperatures with concurrent stirring. Generally, melt polymerizations employ temperatures of 200° C. to 400° C.

A chain-terminating agent may be employed to control the molecular weight of the polysiloxane/polyimide block copolymer. Mono-functional amines such as aniline, or mono-functional anhydrides such as phthalic anhydride may be employed.

The polysiloxane/polyimide block copolymer may be made by first forming the extended siloxane oligomer and then further reacting the extended siloxane oligomer with non-siloxane diamine and dianhydride. Alternatively a non-siloxane diamine and dianhydride may be reacted to form a polyimide oligomer. The polyimide oligomer and extended siloxane oligomer can be reacted to form the polysiloxane/polyimide block copolymer.

When using a polyimide oligomer and an extended siloxane oligomer to form the block copolymer, the stoichiometric ratio of terminal anhydride functionalities to terminal amine functionalities is 0.90 to 1.10, or, more specifically, 0.95 to 1.05. In one embodiment the extended siloxane oligomer is amine terminated and the non-siloxane polyimide oligomer is anhydride terminated. In another embodiment, the extended siloxane oligomer is anhydride terminated and the non-siloxane polyimide oligomer is amine terminated. In another embodiment, the extended siloxane oligomer and the non-siloxane polyimide oligomer are both amine terminated and they are both reacted with a sufficient amount of dianhydride (as described above) to provide a copolymer of the desired molecular weight. In another embodiment, the extended siloxane oligomer and the non-siloxane polyimide oligomer are both anhydride terminated and they are both reacted with a sufficient amount of diamine (as described above) to provide a copolymer of the desired molecular weight. Reaction conditions for the polymerization of the siloxane and polyimide oligomers are similar to those required for the formation of the oligomers themselves and can be determined without undue experimentation by one of ordinary skill in the art.

The siloxane content in the block copolymer is determined by the amount of extended siloxane oligomer used during polymerization. The siloxane content is greater than or equal to 20 weight percent, or, more specifically, greater than or equal to 25 weight percent, based on the total weight of the block copolymer. In some embodiments the siloxane content is less than or equal to 40 weight percent, based on the total weight of the block copolymer. The siloxane content is calculated using the molecular weight of the diamino siloxane used to form the extended siloxane oligomer.

In some embodiments two or more polysiloxane/polyimide block copolymers may be combined to achieve the desired siloxane content for use in the blend. The block copolymers may be used in any proportion. For example, when two block copolymers are used the weight ratio of the first block copolymer to the second block copolymer may be 1 to 99.

The polysiloxane/polyimide block copolymer is present in an amount of 14 to 75 weight percent based on the total weight of the composition. Within this range the polysiloxane/polyimide block copolymer may be present in an amount greater than or equal to 20 weight percent, or, more specifically, greater than or equal to 25 weight percent. Also within this range the polysiloxane/polyimide block copolymer may be present in an amount less than or equal to 70 weight percent, or, more specifically, less than or equal to 65 weight percent, or, more specifically, less than or equal to 60 weight percent.

The polymeric compatibilizer has an average of greater than or equal to 2 pendant epoxy groups per molecule. In some embodiments the polymeric compatibilizer has an average of greater than or equal to 3 pendant epoxy groups per molecule, or, more specifically, an average of greater than or equal to 20 pendant epoxy groups per molecule or, more specifically, an average of greater than or equal to 50 pendant epoxy groups per molecule. The polymeric compatibilizer can have an average of less than or equal to 100 epoxy groups per molecule, or more specifically, less than or equal to 75 epoxy groups per molecule, or, even more specifically, less than or equal to 50 epoxy groups per molecule. As used herein and throughout, a polymeric compatibilizer is a polymeric polyfunctional compound that interacts with the linear poly (arylene sulfide), the polysiloxane/polyimide block copolymer, or both. This interaction may be chemical (e.g. grafting) and/or physical (e.g. affecting the surface characteristics of the disperse phases). When the interaction is chemical, the compatibilizer may be partially or completely reacted with the linear poly(arylene sulfide), the polysiloxane/polyimide block copolymer, or both such that the composition comprises a reaction product.

Illustrative examples of suitable compatibilizers include, but are not limited to, copolymers of glycidyl methacrylate (GMA) with alkenes, copolymers of GMA with alkenes and acrylic esters, copolymers of GMA with alkenes and vinyl acetate, copolymers of GMA and styrene. Suitable alkenes comprise ethylene, propylene, and mixtures of two or more of the foregoing. Suitable acrylic esters comprise alkyl acrylate monomers, including, but not limited to, methyl acrylate, ethyl acrylate, propyl acrylate, butyl acrylate, and combinations of the foregoing alkyl acrylate monomers. When present, the acrylic ester may be used in an amount of 15 wt % to 35 wt % based on the total amount of monomer used in the copolymer. When present, vinyl acetate may be used in an amount of 4 wt % to 10 wt % based on the total amount of monomer used in the copolymer. Illustrative examples of suitable compatibilizers comprise ethylene-glycidyl acrylate copolymers, ethylene-glycidyl methacrylate copolymers, ethylene-glycidyl methacrylate-vinyl acetate copolymers, ethylene-glycidyl methacrylate-alkyl acrylate copolymers, ethylene-glycidyl methacrylate-methyl acrylate copolymers, ethylene-glycidyl methacrylate-ethyl acrylate copolymers, and ethylene-glycidyl methacrylate-butyl acrylate copolymers.

The composition comprises 0.1 weight percent to less than 2.5 weight percent of polymeric compatibilizer, based on the total weight of the composition. Within this range, the composition can comprise less than or equal to 2.0 weight percent. Also within this range, the composition may comprise greater than or equal to 0.4 weight percent, or, more specifically, greater than or equal to 0.5 weight percent.

The composition may further comprise an additive or combination of additives. Exemplary additives include electrically conductive fillers, reinforcing fillers, stabilizers, lubricants, mold release agents, inorganic pigments, UV absorbers; antioxidants, plasticizers; anti-static agents; foaming agents; blowing agents; metal deactivators and combinations comprising one or more of the foregoing. Examples of electrically conductive fillers include conductive carbon black, carbon fibers, metal fibers, metal powder, carbon nanotubes, and the like, and combinations comprising any one of the foregoing electrically conductive fillers. Examples of reinforcing fillers include glass beads (hollow and/or solid), glass flake, milled glass, glass fibers, talc, wollastonite, silica, mica, kaolin or montmorillonite clay, silica, quartz, barite, and the like, and combinations comprising any of the foregoing reinforcing fillers. Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers may have a molecular weight greater than or equal to 300. In some embodiments, phosphorus containing stabilizers with a molecular weight greater than or equal to 500 are useful. Phosphorus containing stabilizers are typically present in the composition at 0.05 to 0.5% by weight of the formulation. Flow aids and mold release compounds are also contemplated.

The thermoplastic composition can be prepared melt mixing or a combination of dry blending and melt mixing. Melt mixing can be performed in single or twin screw type extruders or similar mixing devices which can apply a shear and heat to the components. Melt mixing can be performed at temperatures greater than or equal to the melting temperatures of the block copolymers and less than the degradation temperatures of either of the block copolymers.

All of the ingredients may be added initially to the processing system. In some embodiments, the ingredients may be added sequentially and/or through the use of one or more master batches. It can be advantageous to apply a vacuum to the melt through one or more vent ports in the extruder to remove volatile impurities in the composition.

In some embodiments melt mixing is performed using an extruder and the composition exits the extruder in a strand or multiple strands. The shape of the strand is dependent upon the shape of the die used and has no particular limitation.

EXAMPLES

The examples described below used the materials shown in Table 1.

TABLE 1

| Material | Description | Source |
| --- | --- | --- |
| Polysiloxane/polyimide block copolymer | SILTEM ® 1700 | Sabic Innovative Plastics |
| Linear poly(phenylene sulfide) | Fortron ® 0214B | Ticona |
| Branched poly(phenylene sulfide) | Ryton ® P4 | Chevron Philips |
| Polymeric compatibilizer having an average of 5 pendant epoxy groups per molecule | Joncryl ® ADR4368 | BASF |

Techniques & Procedures

Composition Preparation Techniques: Resin compositions were formed by melt mixing the polysiloxane/polyimide block copolymer and poly(phenylene sulfide)s. Blends were prepared by extrusion in a 2.5-inch twin screw, vacuum vented extruder. Compositions are listed in weight percent, based on the total weight of the composition in the tables below. The extruder was set at about 290-310° C. The blends were run at approximately 300 rotations per minute (rpm) under vacuum. The extrudate was cooled, pelletized, and dried at 120° C. Test samples were injection molded at a set temperature of 300-320° C. and mold temperature of 120° C. using a 30 second cycle time. The pellets were dried for 3-4 hours at 120° C. in a forced air-circulating oven prior to injection molding.

Properties Testing: Properties were measured using ASTM test methods. All molded samples were conditioned for at least 48 hours at 50% relative humidity prior to testing.

ASTM D256: Notched Izod impact values were measured at room temperature on 3.2 millimeter thick bars as per ASTM D256. Bars were notched prior to oven aging; samples were tested at room temperature. Results are in Joules per meter (J/m).

ASTM D638: Tensile properties were measured on 3.2 millimeter type I bars as per ASTM method D638 at 23° C. with a crosshead speed of 5 millimeters/minute. Tensile strength is reported at yield (Y), percent elongation (tensile elongation) is reported at break (B). Tensile modulus, tensile strength at yield, tensile strength at break results are reported in MPa. Tensile strain at yield and tensile elongation at break are reported in percent.

ASTM 790: Flexural properties were measured using 3.2 millimeter type I bars as per ASTM 790 method at 23° C. Flexural modulus and flexural stress at yield are expressed in megapascals (MPa).

ASTM D648: Heat deflection temperature was measured on five bars using ASTM standard D648 at 1.82 MPa. Results are shown in degrees centigrade.

Examples 1-8

The purpose of these Examples was to demonstrate the effect of varying amounts of polysiloxane/polyimide block copolymer and linear poly(arylene sulfide) as well as the presence or absence of the polymeric compatibilizer. Compositions were made in accordance to the composition preparation procedure described above. The compositions were tested as described above and results are shown in Table 2.

TABLE 2

|  | Ex 1* | Ex 2* | Ex 3* | Ex 4* | Ex 5* | Ex 6 | Ex 7* | Ex 8 |
|---|---|---|---|---|---|---|---|---|
| SILTEM 1700 | 95.00 | 94.75 | 85.00 | 84.50 | 75.00 | 74.25 | 50.00 | 49.85 |
| Fortron 0214B | 5.00 | 4.75 | 15.00 | 14.50 | 25.00 | 24.25 | 50.00 | 49.85 |
| Joncryl ADR4368 | — | 0.50 | — | 1.00 | — | 1.00 | — | 0.30 |
| Flex Modulus | 2250 | 2250 | 2350 | 2370 | 2400 | 2420 | 2750 | 2610 |
| Flex Stress at Yield | 107 | 109 | 110 | 112 | 108 | 108 | 119 | 111 |
| HDT | 141 | 142.6 | 138 | 131.3 | 136 | 131 | 123 | 103.7 |
| Notched Izod | 116 | 125 | 104 | 118 | 100 | 97 | 74 | 74.2 |
| Tensile Modulus | 2610 | 2650 | 2700 | 2750 | 2690 | 2650 | 3070 | 2590 |
| Tensile Strength at yield | 65 | 65.4 | 65.3 | 66.3 | 65 | 64 | 68 | 67.4 |
| Tensile Strength at break | 53 | 54.2 | 52.4 | 52.4 | 46 | 56 | 59 | 52.6 |
| Tensile Strain at yield | 5.1 | 5.2 | 5 | 5 | 5 | 5 | 5 | 4.8 |
| Tensile Elongation | 13 | 39.4 | 15.9 | 39.1 | 18 | 103 | 21 | 83.3 |

*Comparative example

The results show that compositions containing (i) 24 to 85 weight percent of a linear poly(arylene sulfide), (ii) 14 to 75 weight percent of a polysiloxane/polyimide block copolymer, and (iii) 0.1 to less than 2.5 weight percent of a polymeric compatibilizer having an average of 2 or more pendant epoxy groups per molecule had markedly higher Tensile Elongation values than compositions having amounts of these components outside the specified ranges. More particularly, Examples 6 and 8 (inventive examples containing a polymeric compatibilizer and having amounts of components in the specified ranges), compared to Examples 5 and 7 (without a polymeric compatibilizer), and other comparative examples, exhibited an unexpected and dramatic improvement in Tensile Elongation. Comparative Examples 1-4 all have amounts of poly(arylene sulfide) and polysiloxane/polyimide block copolymer outside of the specified ranges.

Examples 9-16

The purpose of these Examples was to demonstrate the effect of varying amounts of polymeric compatibilizer. Compositions were made in accordance to the composition preparation procedure described above. The compositions were tested as described above and results are shown in Table 3.

TABLE 3

|  | Ex 9 | Ex 10 | Ex 11 | Ex 12 | Ex 13* | Ex 14* | Ex 15* | Ex. 16* |
|---|---|---|---|---|---|---|---|---|
| SILTEM 1700 | 49.80 | 49.75 | 49.50 | 49.00 | 48.75 | 48.50 | 48.00 | 47.50 |
| Fortron 0214B | 49.80 | 49.75 | 49.50 | 49.00 | 48.75 | 48.50 | 48.00 | 47.50 |
| Joncryl ADR4368 | 0.40 | 0.50 | 1.00 | 2.00 | 2.50 | 3.00 | 4.00 | 5.00 |
| Flex Modulus | 2730 | 2770 | 2960 | 2870 | 2900 | 2940 | 2980 | 3010 |
| Flex Stress at Yield | 115 | 117 | 125 | 120 | 117 | 119 | 123 | 123 |
| HDT | 102.8 | 104.2 | 105.9 | 102.3 | 97.2 | 99.6 | 98.5 | 97.6 |
| Notched Izod | 76.3 | 82.7 | 71.0 | 68.7 | 46.7 | 50 | 47.7 | 47.5 |
| Tensile Modulus | 2570 | 3310 | 3310 | 3310 | 3330 | 2770 | 2780 | 2810 |
| Tensile Strength at yield | 67.7 | 67.1 | 71.6 | 70.9 | 69.8 | 70.0 | 69.8 | 71.3 |
| Tensile Strength at break | 42.1 | 53.7 | 58.4 | 64.2 | 53.3 | 54.6 | 64.1 | 58.0 |
| Tensile Strain at yield | 4.9 | 4.5 | 4.5 | 4.5 | 4.4 | 4.4 | 4.5 | 4.4 |
| Tensile Elongation | 81.9 | 69.8 | 100.8 | 111.3 | 102.6 | 105.5 | 109.3 | 104.2 |

*Comparative example

Examples 9-16 show that compositions having less than or equal to 5 weight percent of a polymeric compatibilizer having 2 or more epoxy groups per molecule have a tensile elongation of greater than or equal 60%. It is noted that some examples, e.g. Comparative Examples 13-16, a decrease in Notched Izod impact strength is seen in compositions having greater than or equal to 2.5 weight percent of a polymeric compatibilizer.

Examples 17-20

The purpose of these Examples was to demonstrate the effect of varying amounts of polysiloxane/polyimide block copolymer and linear poly(arylene sulfide) as well as the presence or absence of the polymeric compatibilizer. Compositions were made in accordance to the composition preparation procedure described above. The compositions were tested as described above and results are shown in Table 4.

TABLE 4

|  | Ex 17* | Ex 18* | Ex 19* | Ex 20* |
| --- | --- | --- | --- | --- |
| SILTEM 1700 | 15.00 | 14.50 | 5.00 | 4.75 |
| Fortran 0214B | 85.00 | 84.50 | 95.00 | 94.75 |
| Joncryl ADR4368 |  | 1.00 |  | 0.50 |
| Flex Modulus | 2850 | 3350 | 3150 | 3220 |
| Flex Stress at Yield | 109 | 121 | 119 | 122 |
| HDT | 116 | 93.4 | 113 | 91.1 |
| Notched Izod | 32.4 | 33.0 | 26.9 | 26.7 |
| Tensile Modulus | 3610 | 3940 | 3580 | 3830 |
| Tensile Strength at yield | 70 | 74.4 | 69.4 | 73.9 |
| Tensile Strength at break | 64.5 | 69.4 | 61.3 | 67.3 |
| Tensile Strain at yield | 3.7 | 3.5 | 3.2 | 3 |
| Tensile Elongation | 8.9 | 141.4 | 7.8 | 2.7 |

*Comparative Example

The results show that compositions containing (i) 24 to less than 84.5 weight percent of a linear poly(arylene sulfide) (ii) 14 to 75 weight percent of a polysiloxane/polyimide block copolymer; and (iii) 0.1 to less than 2.5 weight percent of a polymeric compatibilizer having 2 or more pendant epoxy groups per molecule had markedly higher Tensile Elongation values than compositions having amounts of these components outside the specified ranges. Example 18 (containing a polymeric compatibilizer) compared to Example 17 (without a polymeric compatibilizer) shows an exceptional improvement in Tensile Elongation. However, it contains more than the required amount of the linear poly(arylene sulfide) and it does not meet the minimum required Notched Izod properties; Examples 19 and 20 have amounts of poly(arylene sulfide) and polysiloxane/polyimide block copolymer outside of the specified ranges and Example 19, which does not contain a polymeric compatibilizer actually has a Tensile Elongation greater than Example 20 which does have polymeric compatibilizer.

Examples 21-24

The purpose of these Examples was to demonstrate the effect of branched poly(arylene sulfide) as well as the presence or absence of the polymeric compatibilizer. Compositions were made in accordance to the composition preparation procedure described above. The compositions were tested as described above and results are shown in Table 5.

TABLE 5

|  | 21* | 22* | 23* | 24* |
| --- | --- | --- | --- | --- |
| SILTEM 1700 | 50 | 49.5 | 25 | 24.75 |
| RYTON P4 | 50 | 49.5 | 75 | 74.25 |
| Joncryl ADR4368 |  | 1 |  | 1 |
| Tensile Strength at yield | 68 | 67 | 52.9 | 55.9 |
| Tensile Modulus | 2509 | 2516 | 2893 | 3011 |
| Tens Elongation (%) | 4.6 | 6 | 2.8 | 2.8 |
| Flex Stress at Yield | 121 | 107 | 116 | 123 |
| Flex Modulus | 2949 | 2546 | 3082 | 3000 |
| HDT | 95 | 95 | 91 | 90 |
| Notched Izod | 30 | 39 | 28 | 31 |

*Comparative example

These examples show that the presence or absence of a polymeric compatibilizer has little effect on Tensile Elongation in compositions comprising a branched poly(arylene sulfide).

All ASTM tests were performed as required by the 2003 edition of the Annual Book of ASTM Standards unless otherwise indicated. All notched and unnotched Izod data and values were/are determined according to ASTM D256 at 23° C. as described in the Examples section unless another temperature has been specified. All tensile modulus, tensile strength, and tensile elongation at break data and values were/are determined according to ASTM D638 as described in the Examples section. All flexural modulus and flexural strength data and values were/are determined according to ASTM D790 as described in the Examples section. All glass transition and melting temperatures are/were determined by differential scanning calorimetry (DSC) in a nitrogen atmosphere.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A composition comprising a compatible blend of
   i) 24 to less than 84.5 weight percent of a linear poly (arylene sulfide)
   ii) 14 to 75 weight percent of a polysiloxane/polyimide block copolymer; and
   iii) 0.1 to less than 2.5 weight percent of a polymeric compatibilizer having an average of 2 or more epoxy groups per molecule
   wherein weight percent is based on the total weight of the composition and an article made from the composition has tensile elongation greater than or equal to 60% as determined by ASTM D638 and a Notched Izod impact of greater than 50 joules per meter as determined by ASTM D256 at room temperature.

2. The composition of claim 1, where in an article made from the composition has (1) a heat deflection temperature at 1.82 megapascals of greater than or equal to 90 degrees C. as determined by ASTM D648.

3. The composition of claim 1, wherein the linear poly (arylene sulfide) is poly(phenylene sulfide).

4. The composition of claim 1, wherein the polysiloxane/polyimide block copolymer comprises repeating siloxane units (d) of formula (I):

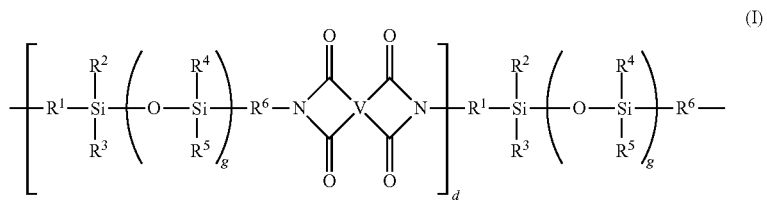

wherein $R^{1-6}$ are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is greater than or equal to 1.

5. The composition of claim 1, wherein the polysiloxane/polyimide block copolymer has a siloxane content of 20 to 40 weight percent, based on the total weight of the block copolymer.

6. The composition of claim 1, wherein the polymeric compatibilizer has an average of 3 to 20 epoxy groups per molecule.

7. The composition of claim 1, wherein the polymeric compatibilizer has an average of greater than or equal to 50 epoxy groups per molecule.

8. The composition of claim 1, wherein the polymeric compatibilizer is present in an amount of 0.1 to 3 weight percent.

9. The composition of claim 1, wherein the linear poly(arylene sulfide) is present in an amount of 30 to 75 weight percent.

10. The composition of claim 1, wherein the polysiloxane/polyimide block copolymer) is present in an amount of 20 to 85 weight percent.

11. The composition of claim 1, wherein the polysiloxane/polyimide block copolymer comprises two polysiloxane/polyimide block copolymers.

12. An article comprising the composition of claim 1.

13. A composition comprising the reaction product of melt blending
   i) 24 to less than 84.5 weight percent of a linear poly(arylene sulfide);
   ii) 14 to 75 weight percent of a polysiloxane/polyimide block copolymer;
   iii) 0.1 to less than 2.5 weight percent of a polymeric compatibilizer having 2 or more epoxy groups per molecule wherein the composition has a tensile elongation greater than or equal to 100% as determined by ASTM D638 and weight percent is based on the total weight of the composition.

14. The composition of claim 12, where in an article made from the composition has (1) a heat deflection temperature at 1.82 megapascals of greater than or equal to 90 degrees C. as determined by ASTM D648, and (2) a Notched Izod impact of greater than or equal to 50 joules per meter as determined by ASTM D256 at room temperature.

15. The composition of claim 13, wherein the linear poly(arylene sulfide) is poly(phenylene sulfide).

16. The composition of claim 13, wherein the polysiloxane/polyimide block copolymer comprises repeating siloxane units (d) of formula (I):

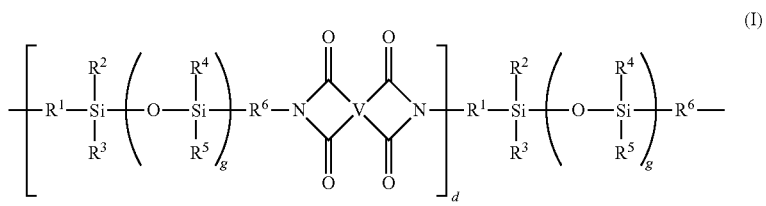

wherein $R^{1-6}$ are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is greater than or equal to 1.

17. The composition of claim 13, wherein the polysiloxane/polyimide block copolymer has a siloxane content of 20 to 40 weight percent, based on the total weight of the block copolymer.

18. The composition of claim 13, wherein the polymeric compatibilizer has an average of 3 to 20 epoxy groups per molecule.

19. The composition of claim 13, wherein the polymeric compatibilizer has an average of greater than or equal to 50 epoxy groups per molecule.

20. The composition of claim 13, wherein the polymeric compatibilizer is present in an amount of 0.1 to 3 weight percent.

21. The composition of claim 13, wherein the linear poly (arylene sulfide) is present in an amount of 30 to 75 weight percent.

22. The composition of claim 13, wherein the polysiloxane/polyimide block copolymer) is present in an amount of 20 to 85 weight percent.

23. The composition of claim 13, wherein the polysiloxane/polyimide block copolymer comprises two polysiloxane/polyimide block copolymers.

24. The composition of claim 1, wherein the composition contains less than 5 weight % of a branched poly(arylene sulfide).

25. The composition of claim 1, wherein the composition does not contain any branched poly(arylene sulfide).

* * * * *